US012591083B2

(12) United States Patent
Yaegashi et al.

(10) Patent No.: US 12,591,083 B2
(45) Date of Patent: Mar. 31, 2026

(54) METHOD FOR MANUFACTURING DIFFRACTION GRATING AND METHOD FOR MANUFACTURING REPLICA GRATING

(71) Applicant: HITACHI HIGH-TECH CORPORATION, Tokyo (JP)

(72) Inventors: Kenta Yaegashi, Tokyo (JP); Yoshisada Ebata, Tokyo (JP); Takanori Aono, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 194 days.

(21) Appl. No.: 18/570,178

(22) PCT Filed: Jun. 2, 2022

(86) PCT No.: PCT/JP2022/022546
§ 371 (c)(1),
(2) Date: Dec. 14, 2023

(87) PCT Pub. No.: WO2023/281950
PCT Pub. Date: Jan. 12, 2023

(65) Prior Publication Data
US 2024/0411068 A1     Dec. 12, 2024

(30) Foreign Application Priority Data
Jul. 5, 2021     (JP) ................................. 2021-111419

(51) Int. Cl.
B29D 11/00 (2006.01)
B32B 3/30 (2006.01)
(Continued)

(52) U.S. Cl.
CPC ...... G02B 5/1852 (2013.01); B29D 11/00769 (2013.01); B32B 3/30 (2013.01);
(Continued)

(58) Field of Classification Search
CPC ......... B32B 17/061; B32B 7/12; B32B 27/38; B32B 3/30; B32B 17/10; B32B 15/20;
(Continued)

(56) References Cited

U.S. PATENT DOCUMENTS 6,200,711 B1     3/2001     Kurihara et al.
2016/0282526 A1     9/2016     Aono et al.
(Continued)

FOREIGN PATENT DOCUMENTS

JP     S59-65810 A     4/1984
JP     H11-223714 A     8/1999
(Continued)

OTHER PUBLICATIONS

Aono, et al., Two-Dimensional Curving Techniques from Flat Diffraction Grating to Concave Diffraction Grating, pp. 1728-1731, 2019, 20th International Conference on Solid-State Sensors, Actuators and Microsystems & Eurosensors XXXIII.
(Continued)

*Primary Examiner* — Monica A Huson
(74) *Attorney, Agent, or Firm* — Baker Botts L.L.P

(57) ABSTRACT

This invention relates to a method of manufacturing a diffraction grating 7. First, a wafer 1a having, on a front surface FS1 thereof, a pattern 1b having a shape in which concave portions and convex portions are alternately arranged is prepared. Next, a metal film 3 is formed on the front surface FS1 of the wafer 1a, and a transfer area 3a to which the shape of the pattern 1b is transferred is formed on a part of a front surface FS2 of the metal film 3. Next, the metal film 3 is removed from the wafer 1a. Next, a back surface BS2 of the metal film 3 is bonded to a glass substrate 5 via a bonding agent 4.

13 Claims, 14 Drawing Sheets

(51) Int. Cl.

| | |
|---|---|
| *B32B 7/12* | (2006.01) |
| *B32B 15/20* | (2006.01) |
| *B32B 17/06* | (2006.01) |
| *B32B 17/10* | (2006.01) |
| *B32B 27/38* | (2006.01) |
| *G02B 5/18* | (2006.01) |
| *B29K 63/00* | (2006.01) |

(52) U.S. Cl.
CPC ................ *B32B 7/12* (2013.01); *B32B 15/20* (2013.01); *B32B 17/061* (2013.01); *B32B 17/10* (2013.01); *B32B 27/38* (2013.01); *B29K 2063/00* (2013.01); *B32B 2255/06* (2013.01); *B32B 2255/205* (2013.01); *B32B 2307/416* (2013.01); *B32B 2307/418* (2013.01); *B32B 2551/00* (2013.01)

(58) Field of Classification Search
CPC .......... B32B 2255/205; B32B 2551/00; B32B 2307/418; B32B 2307/416; B32B 2255/06; G02B 5/1857; G02B 5/18; G02B 5/1852; G02B 5/1861; B29D 11/00769; B29D 11/0048; B29K 2063/00
See application file for complete search history.

(56) References Cited

U.S. PATENT DOCUMENTS

| | | |
|---|---|---|
| 2020/0278481 A1 | 9/2020 | Yaegashi et al. |
| 2021/0318473 A1 | 10/2021 | Yaegashi et al. |

FOREIGN PATENT DOCUMENTS

| | | |
|---|---|---|
| JP | 2003-172639 A | 6/2003 |
| WO | WO 2014/148118 A1 | 9/2014 |
| WO | WO 2019/130835 A1 | 7/2019 |
| WO | WO 2020/021989 A1 | 1/2020 |

OTHER PUBLICATIONS

Extended European Search Report, mailed Jun. 4, 2025, for European Application No. 22835555.8.
International Search Report, mailed Aug. 16, 2022, for International Application No. PCT/JP2022/022546.

[FIG. 1]
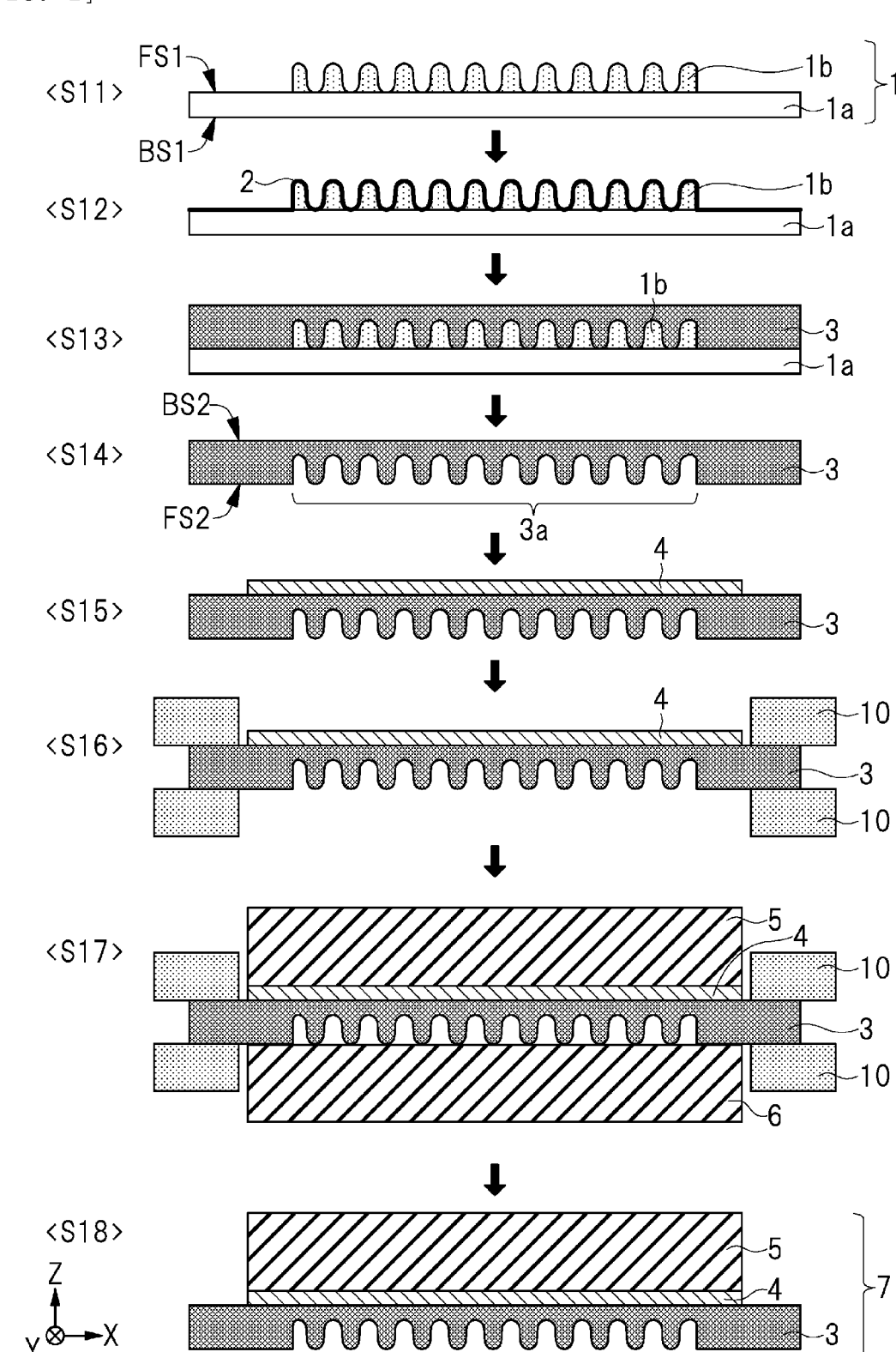

[FIG. 2]
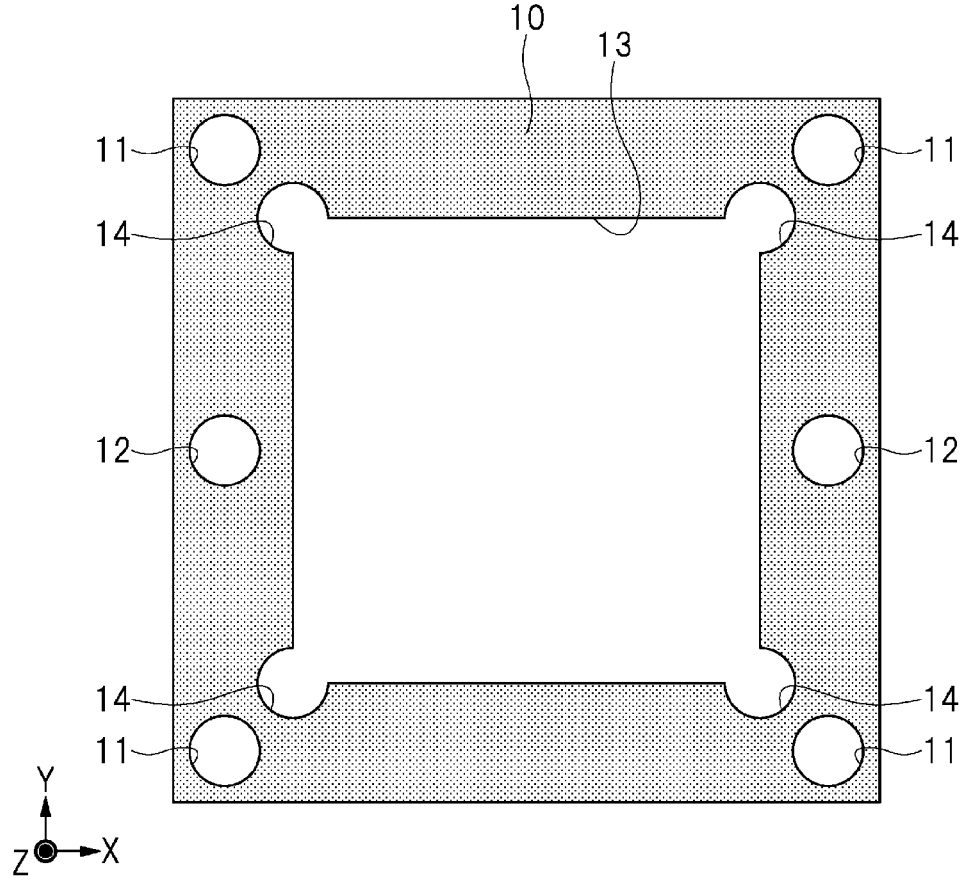

[FIG. 3]
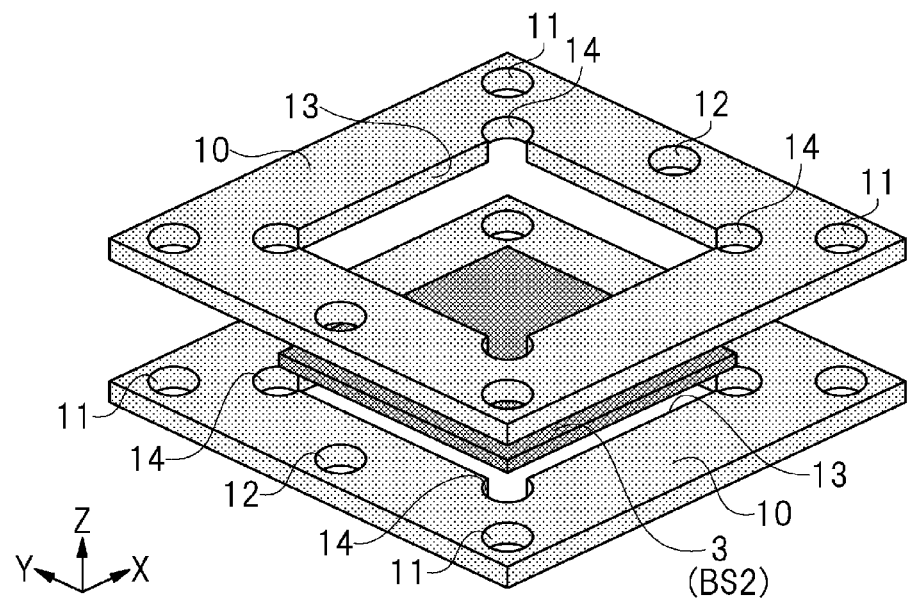
[FIG. 4]
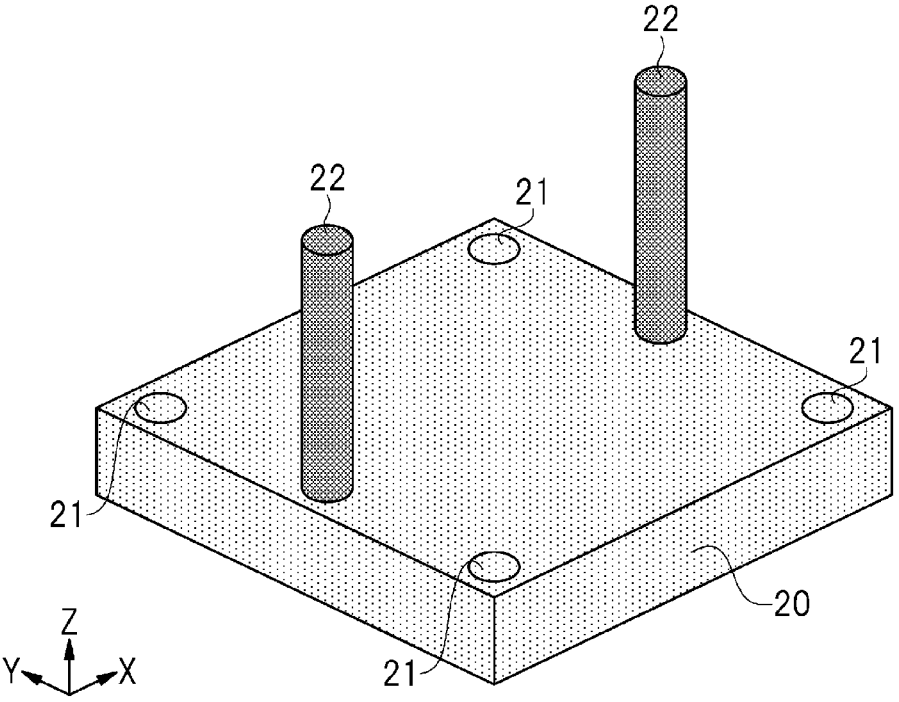

[FIG. 5]
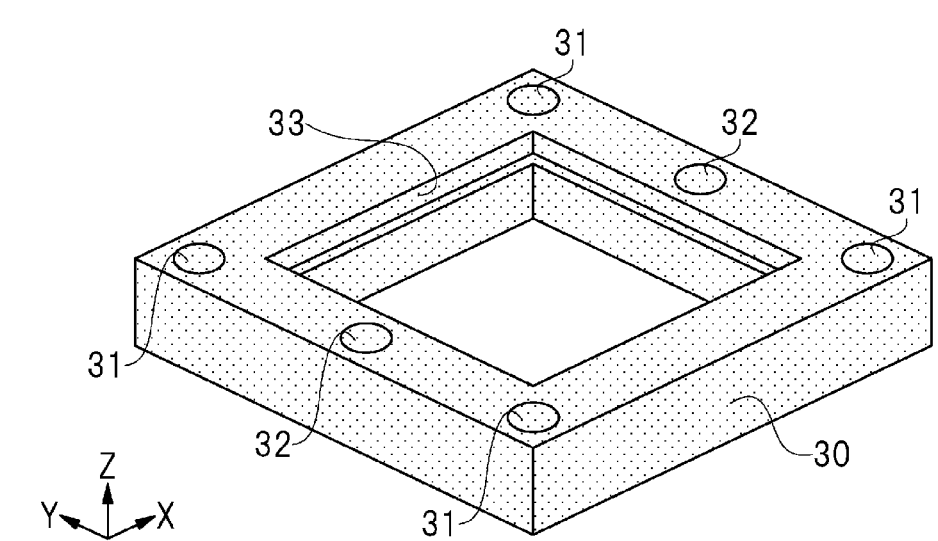
[FIG. 6]
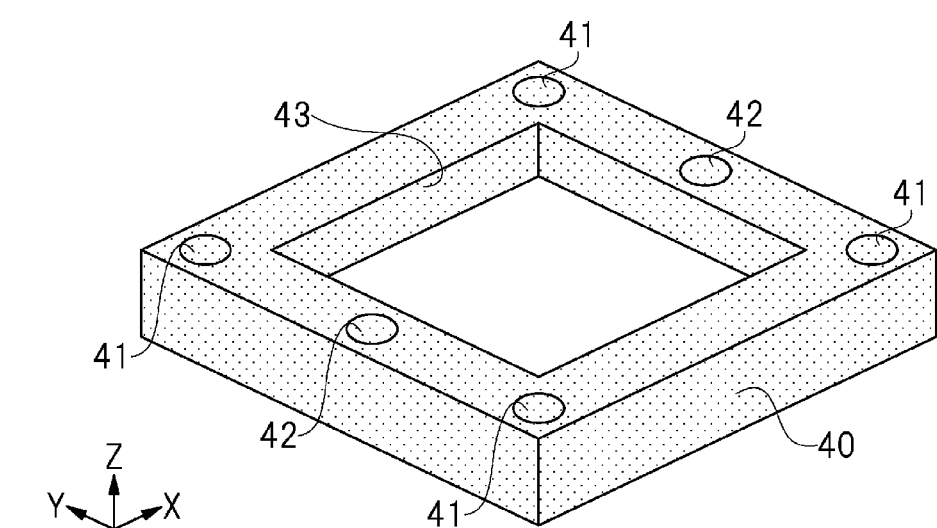

[FIG. 7]
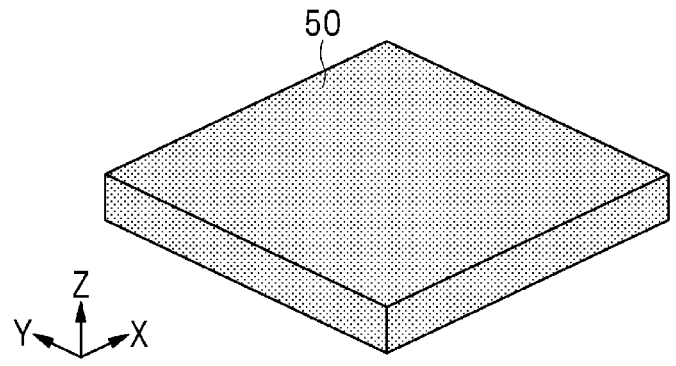
[FIG. 8]
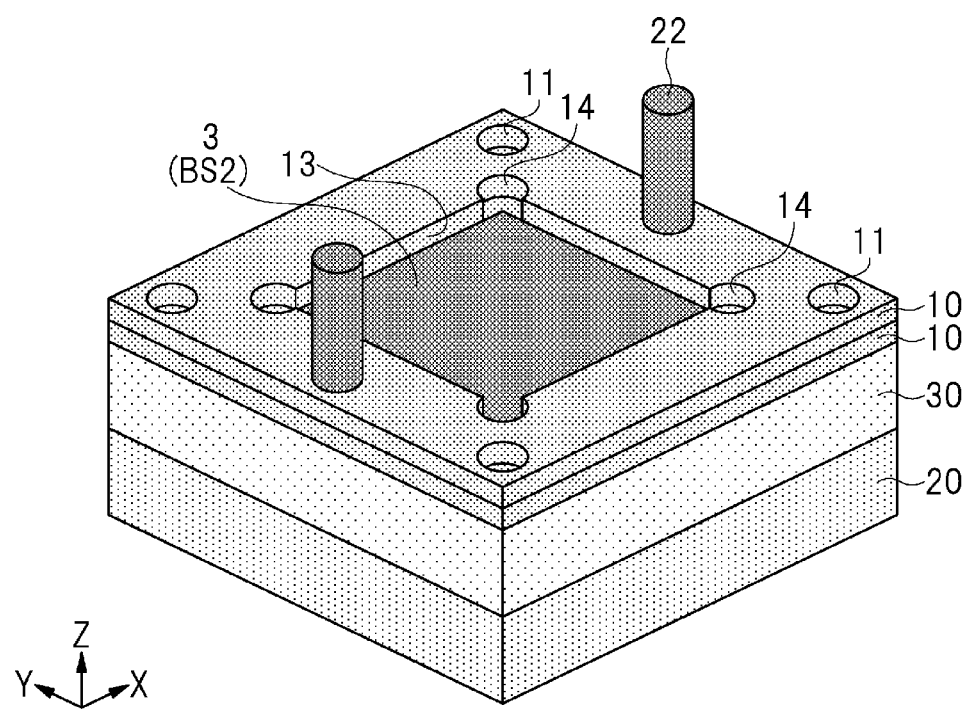

[FIG. 9]
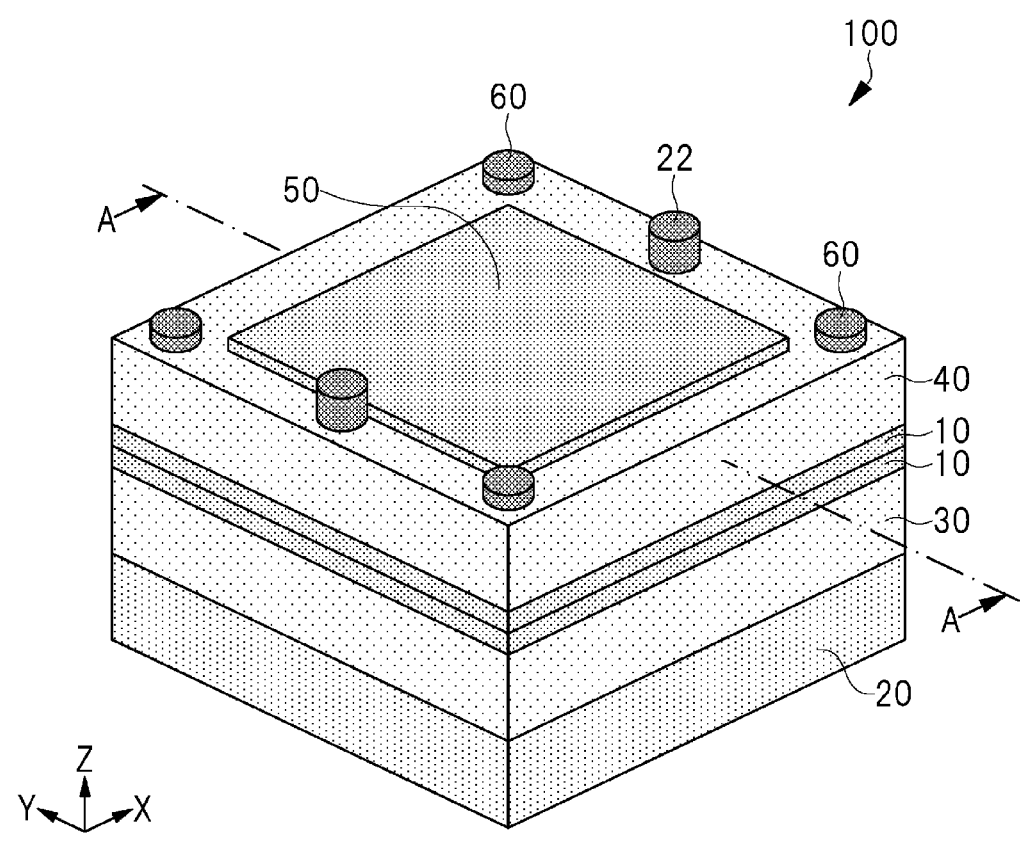

[FIG. 10]
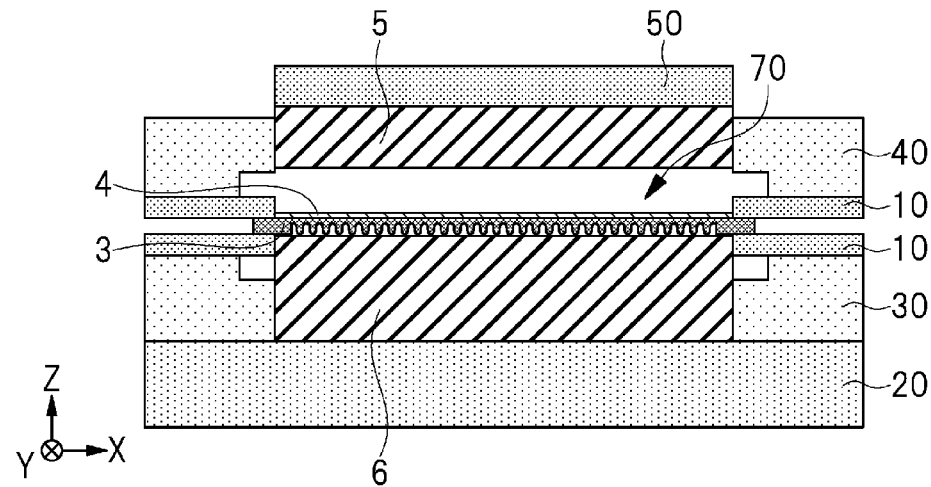
A-A CROSS SECTION
(BEFORE LOAD APPLICATION)
[FIG. 11]
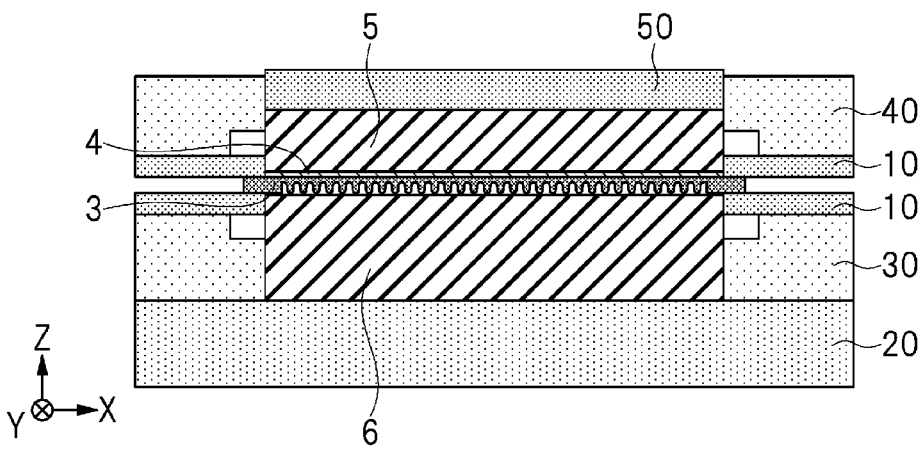
A-A CROSS SECTION
(AFTER LOAD APPLICATION)

[FIG. 12]
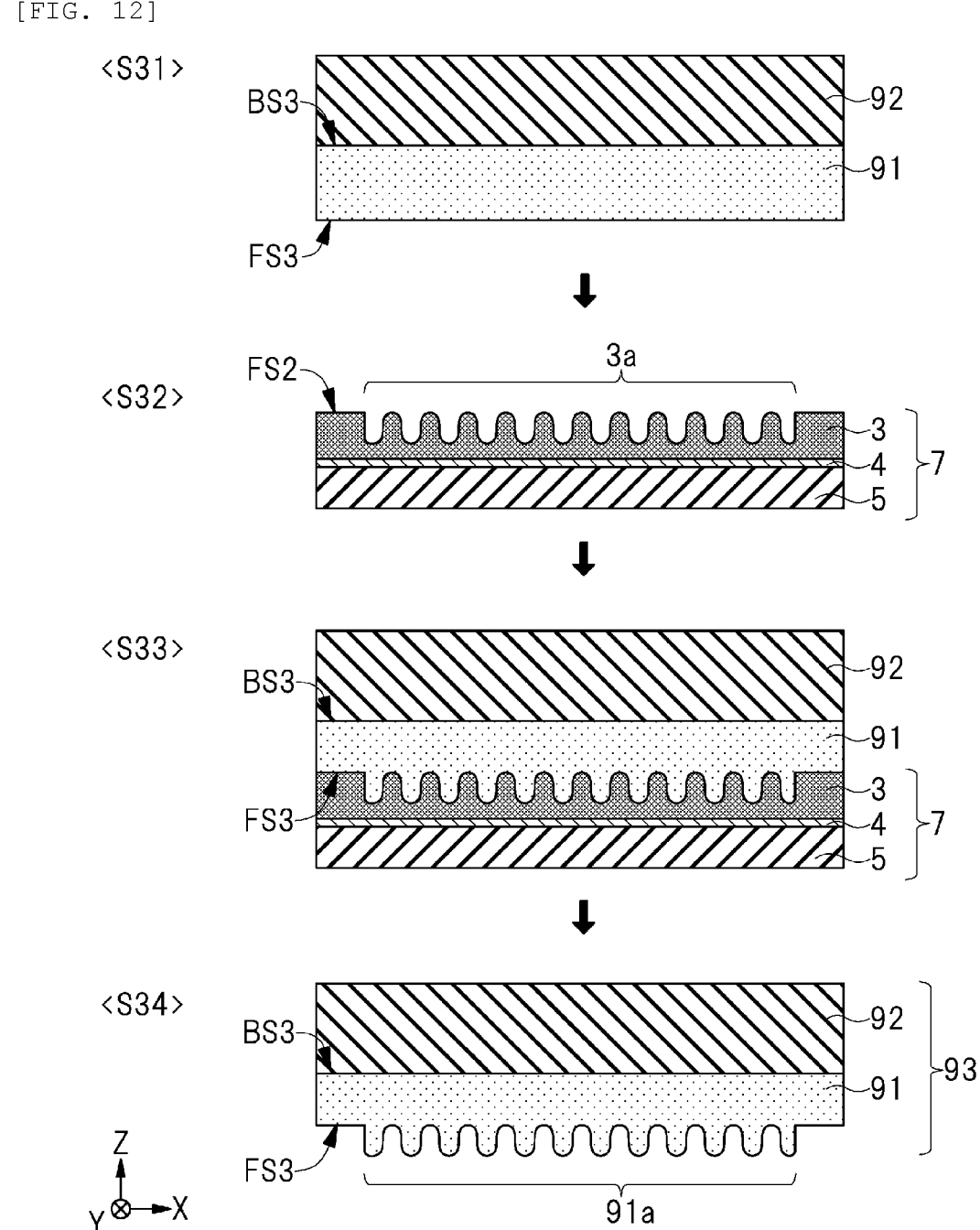

[FIG. 13]
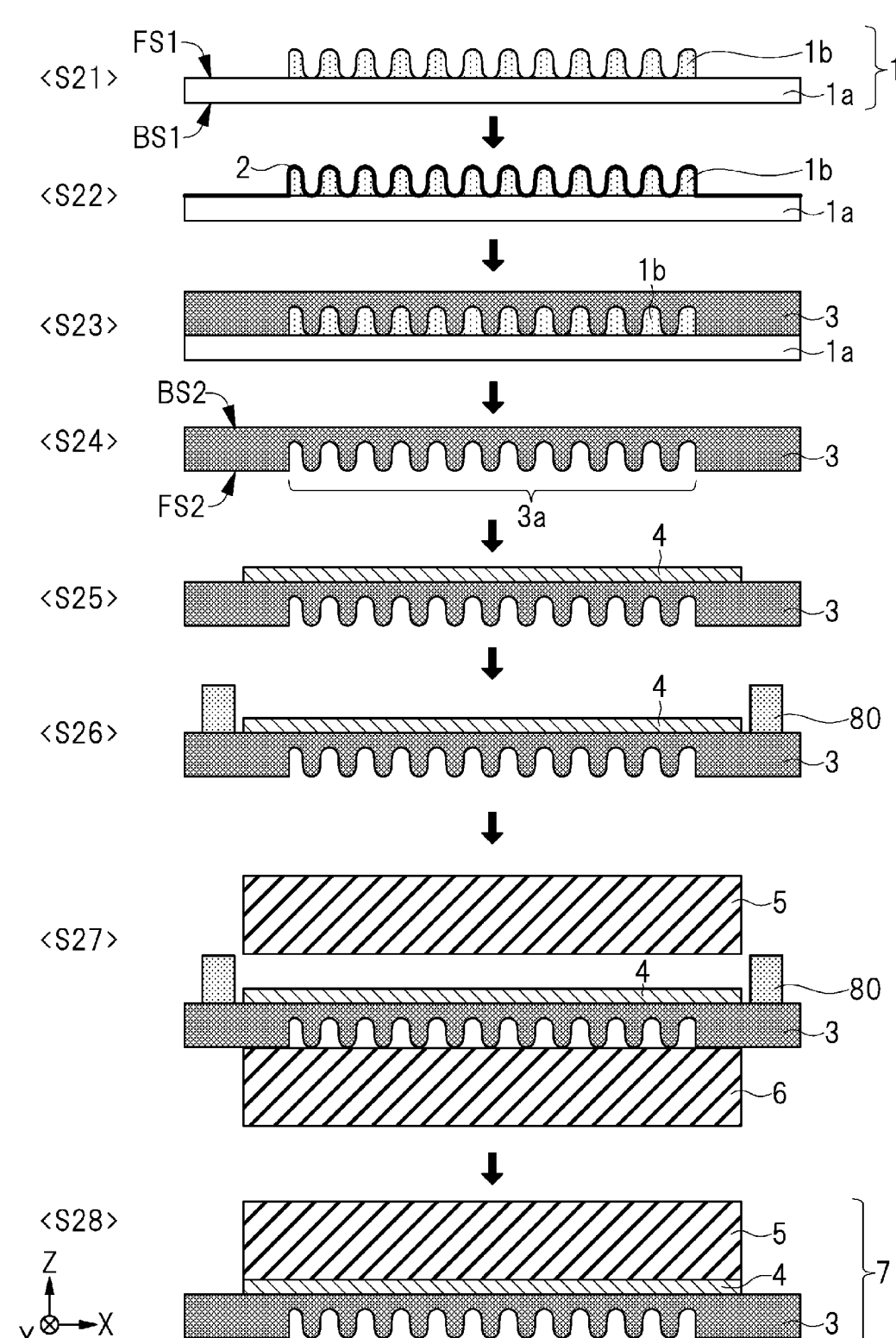

[FIG. 14]
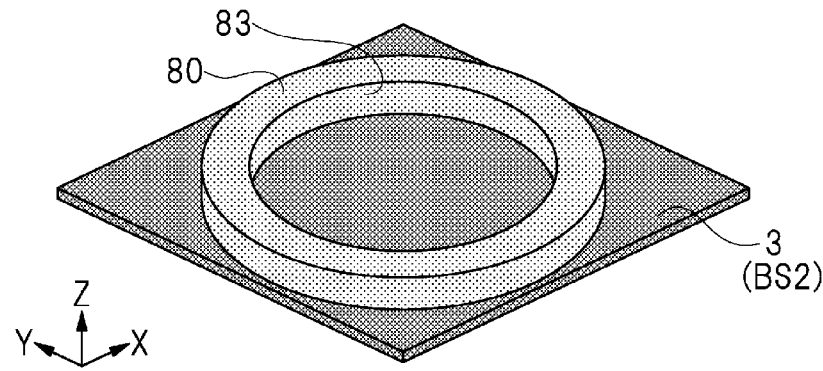
[FIG. 15]
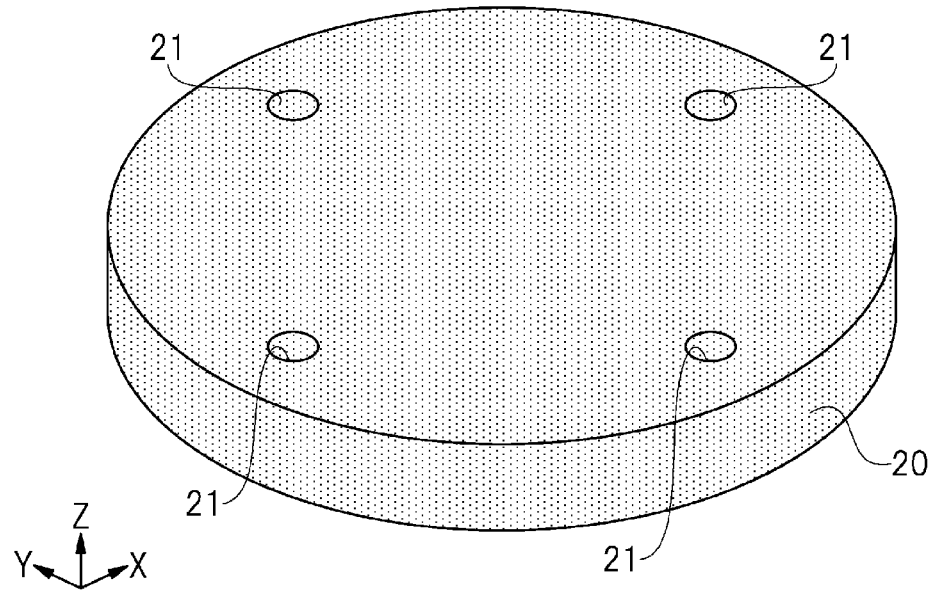

[FIG. 16]
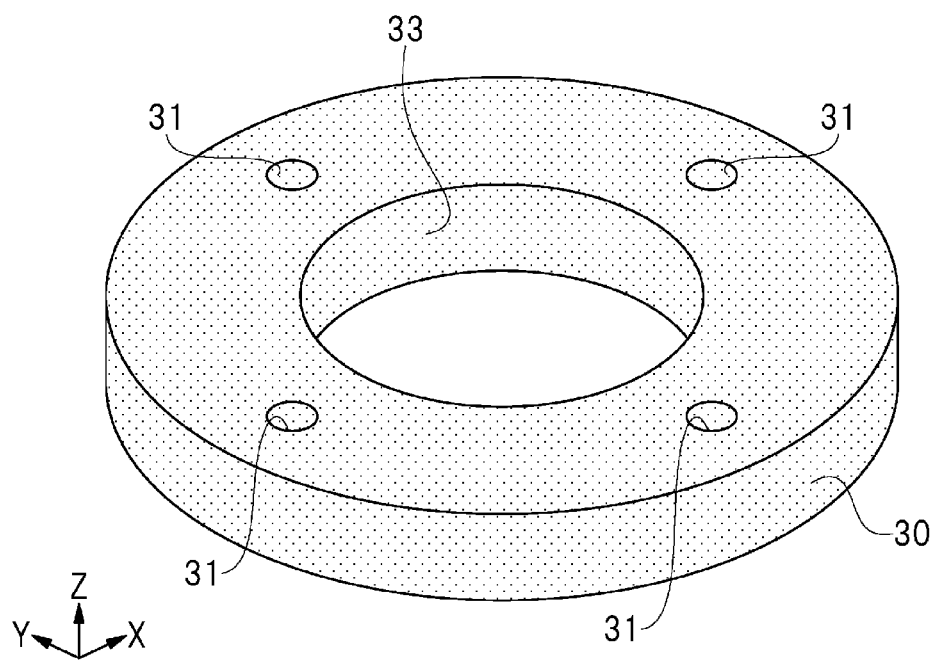
[FIG. 17]
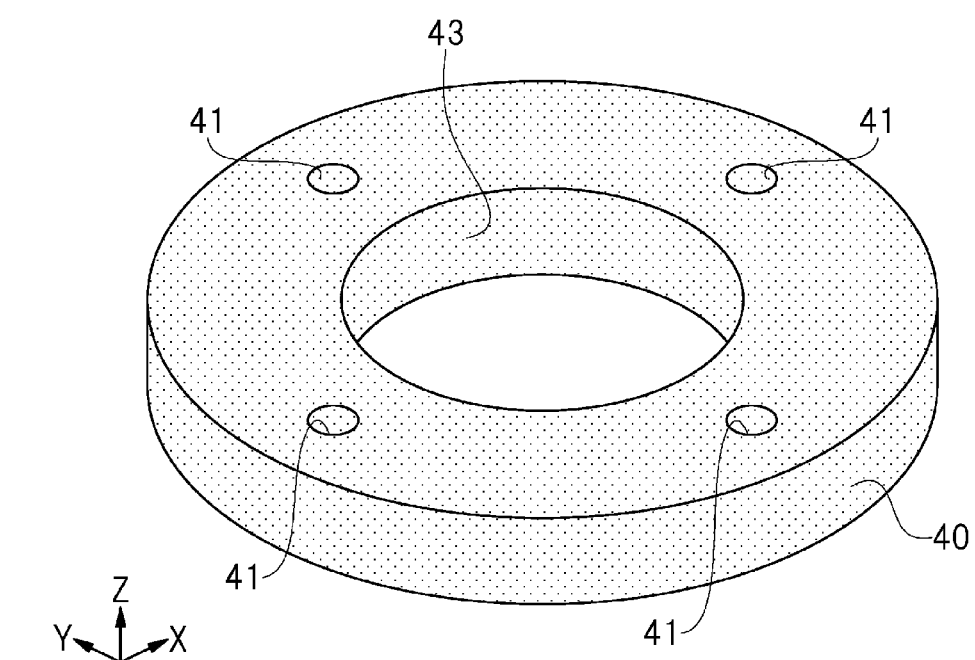

[FIG. 18]
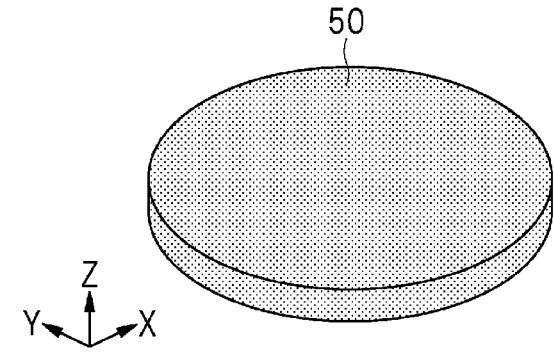
[FIG. 19]
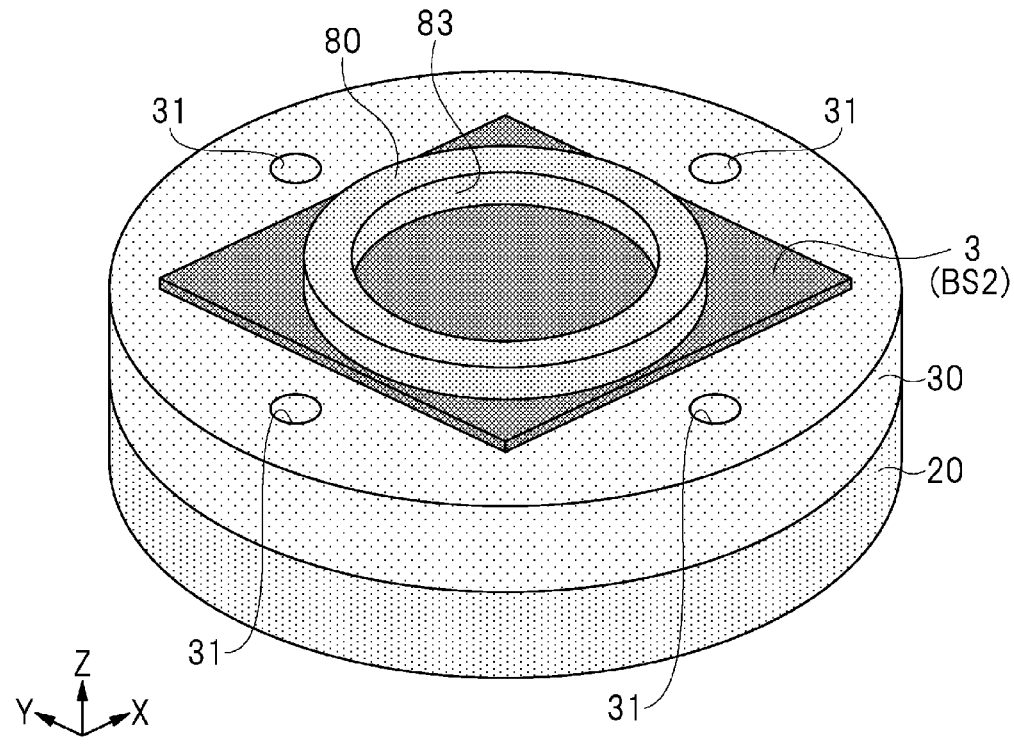

[FIG. 20]
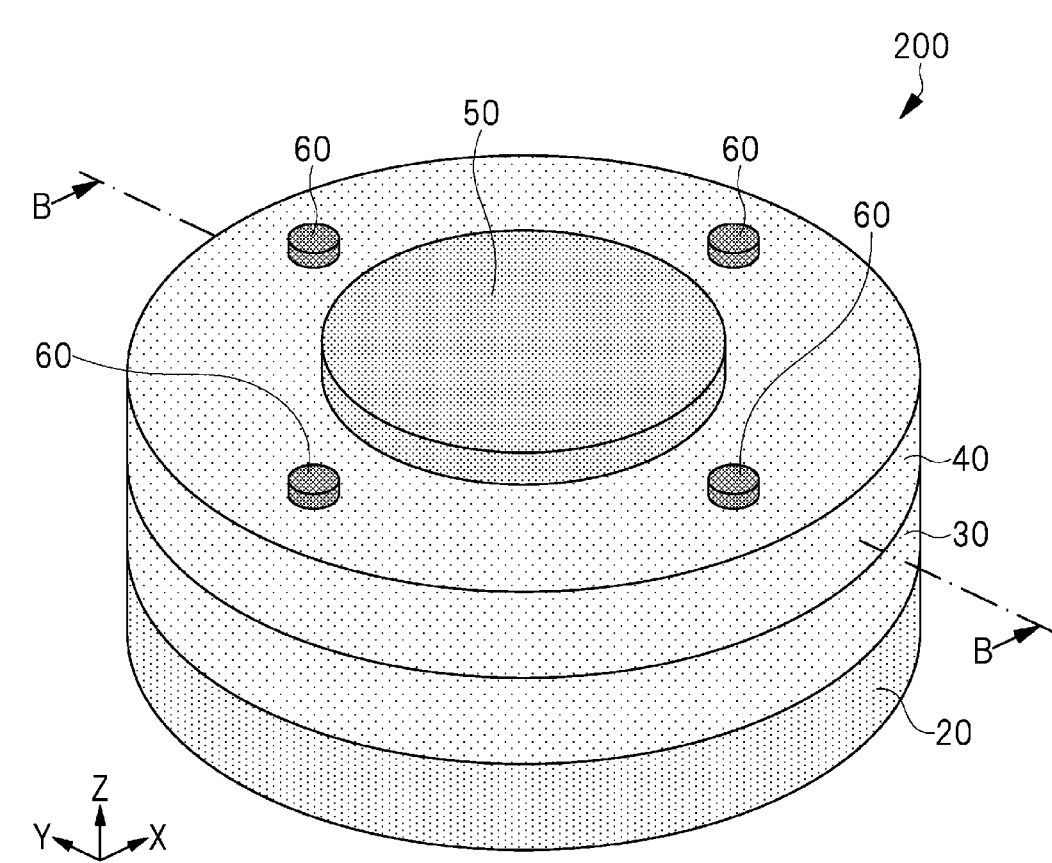

[FIG. 21]
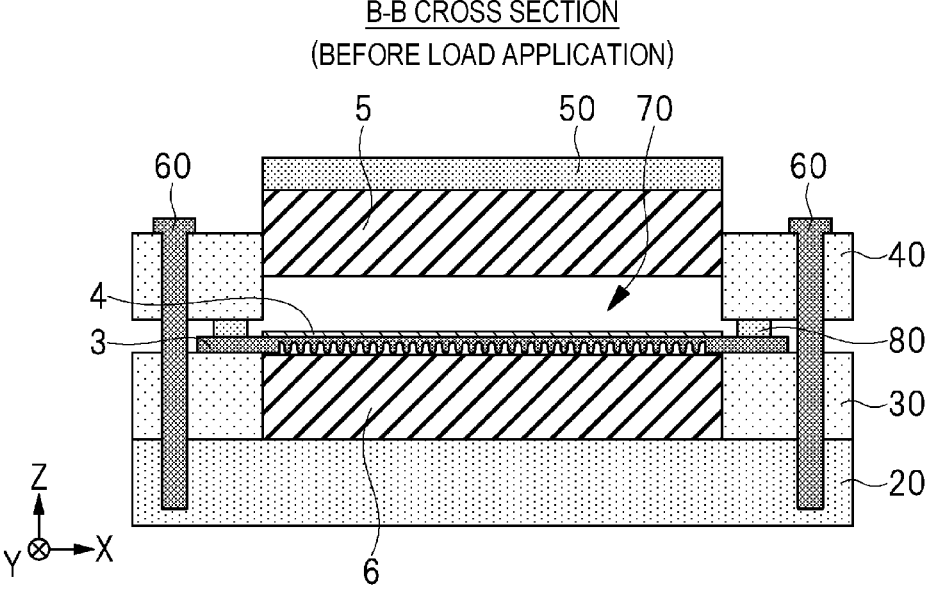
[FIG. 22]
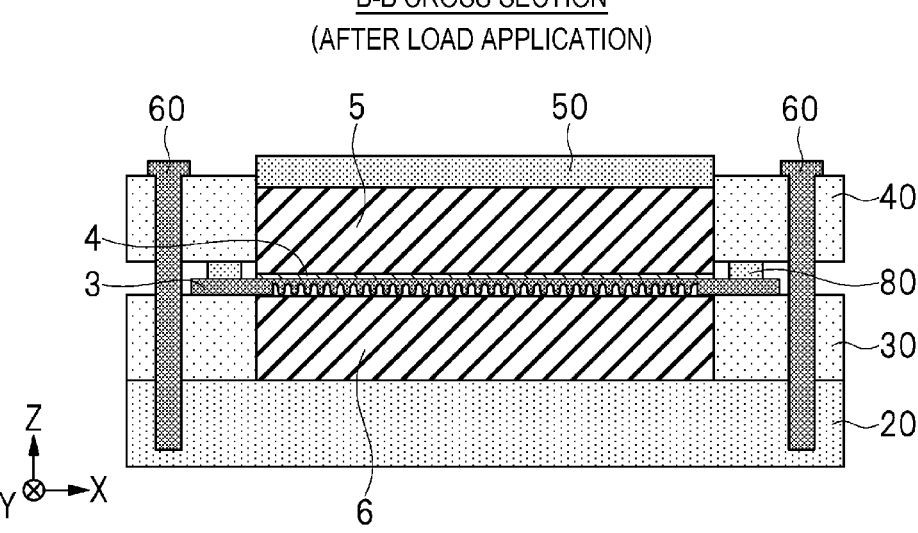

METHOD FOR MANUFACTURING DIFFRACTION GRATING AND METHOD FOR MANUFACTURING REPLICA GRATING

TECHNICAL FIELD

The present invention relates to a method for manufacturing a diffraction grating and a method for manufacturing a replica grating performed by using the diffraction grating as a mold.

BACKGROUND ART

A diffraction grating is an optical element used in a spectrometer of an analysis device, or the like, and is used to separate light (white light) containing a mixture of various wavelengths into narrow-band wavelengths. Fine grooves are carved on a front surface of the diffraction grating, and a reflective film is deposited on the surfaces of the fine grooves.

In related art, a method can be implemented in which a master diffraction grating is manufactured by marking grooves on a glass substrate coated with a metal film using a processing machine such as a ruling engine, and a replica grating is manufactured by transferring a groove shape marked in the master diffraction grating to a resin film or a metal film.

In recent years, as a technique for manufacturing a diffraction grating, there is a method using holographic exposure using two-beam interference of a laser. In the method using holographic exposure, a diffraction grating is manufactured by performing holographic exposure on a photoresist coated on a silicon wafer.

In recent years, a semiconductor manufacturing technique is also used as a technique for manufacturing a diffraction grating. For example, PTL 1 discloses a technique for manufacturing a phase shift mask for manufacturing a diffraction grating by using an exposure device used for manufacturing a semiconductor and etching processing. PTL 1 discloses a technique in which a glass substrate is etched by high-density plasma etching using a resist pattern as a mask, and further wet etching is performed on the glass substrate to form an uneven shape on the glass substrate.

PTL 2 discloses a method for manufacturing a sinusoidal optical grating by transferring an uneven shape formed on a resist to a glass substrate using an anisotropic dry etching method such as low-pressure high-density plasma etching.

CITATION LIST

Patent Literature

PTL 1: JP11-223714A
PTL 2: JP2003-172639A

SUMMARY OF INVENTION

Technical Problem

In the technique of the related art, high surface precision cannot be implemented since warpage of a silicon wafer is also transferred when an uneven shape formed on the silicon wafer is transferred to a resin film. In the methods using high-density plasma etching that are disclosed in PTL 1 and PTL 2, it is difficult to prepare a silicon wafer or a glass substrate without warpage.

As a size of the silicon wafer increases, the warpage of the silicon wafer also increases, making it difficult to increase an area of the diffraction grating.

On the other hand, in order to prevent the warpage of the silicon wafer, a method of transferring an uneven shape of a diffraction grating to a resin film by performing transfer with a load being applied to the silicon wafer is also studied. However, when a peripheral portion of the diffraction grating is a free end, a bonding agent for bonding the diffraction grating and the resin film contracts, and wrinkles are generated. Therefore, the high surface precision cannot be implemented.

A main object of the present application is to provide a diffraction grating that has high surface precision and can be made large in area. Other problems and novel features will become apparent from the description of the present description and the accompanying drawings.

Solution to Problem

A method for manufacturing a diffraction grating in one embodiment includes: a step (a) of preparing a wafer having, on a front surface thereof, a pattern having a shape in which concave portions and convex portions are alternately arranged; a step (b) of, after the step (a), forming a metal film on the front surface of the wafer and forming, on a part of the front surface of the metal film, a first transfer area to which the shape of the pattern is transferred; a step (c) of, after the step (b), removing the metal film from the wafer; and a step (d) of, after the step (c), bonding a back surface of the metal film to a first glass substrate via a bonding agent.

Advantageous Effects of Invention

According to one embodiment, a diffraction grating that has high surface precision and can be made large in area can be provided.

BRIEF DESCRIPTION OF DRAWINGS

FIG. 1 is a cross-sectional view showing an outline of a method for manufacturing a diffraction grating in Embodiment 1.

FIG. 2 is a plan view showing a restraint jig in Embodiment 1.

FIG. 3 is a perspective view showing the restraint jig and a metal film in Embodiment 1.

FIG. 4 is a perspective view showing a base plate in Embodiment 1.

FIG. 5 is a perspective view showing a lower fixing plate in Embodiment 1.

FIG. 6 is a perspective view showing an upper fixing plate in Embodiment 1.

FIG. 7 is a perspective view showing a load applying plate in Embodiment 1.

FIG. 8 is a perspective view showing a process of installing the metal film on a bonding jig in Embodiment 1.

FIG. 9 is a perspective view showing a state where the metal film is installed on the bonding jig in Embodiment 1.

FIG. 10 is a cross-sectional view showing a state where the metal film is installed on the bonding jig in Embodiment 1.

FIG. 11 is a cross-sectional view showing a state where the metal film is installed on the bonding jig in Embodiment 1.

FIG. 12 is a cross-sectional view showing an outline of a method for manufacturing a replica grating in Embodiment 1.

FIG. 13 is a cross-sectional view showing an outline of a method for manufacturing a diffraction grating in Embodiment 2.

FIG. 14 is a perspective view showing a restraint jig and a metal film in Embodiment 2.

FIG. 15 is a perspective view showing a base plate in Embodiment 2.

FIG. 16 is a perspective view showing a lower fixing plate in Embodiment 2.

FIG. 17 is a perspective view showing an upper fixing plate in Embodiment 2.

FIG. 18 is a perspective view showing a load applying plate in Embodiment 2.

FIG. 19 is a perspective view showing a process of installing the metal film on the bonding jig in Embodiment 2.

FIG. 20 is a perspective view showing a state where the metal film is installed on the bonding jig in Embodiment 2.

FIG. 21 is a cross-sectional view showing a state where the metal film is installed on the bonding jig in Embodiment 2.

FIG. 22 is a cross-sectional view showing a state where the metal film is installed on the bonding jig in Embodiment 2.

DESCRIPTION OF EMBODIMENTS

Hereinafter, embodiments will be described in detail with reference to the drawings. In all the drawings for describing the embodiments, members having the same functions are denoted by the same reference numerals, and a repeated description thereof is omitted. In the following embodiments, the description of the same or similar parts will not be repeated in principle except when necessary.

An X direction, a Y direction, and a Z direction described in the present application intersect each other and are orthogonal to each other. In the present application, the Z direction is described as a longitudinal direction, an up-down direction, a height direction, or a thickness direction of a structure. The expression "plan view" used in the present application means viewing a plane formed by the X direction and the Y direction from the Z direction, and the expression "planar shape" means the above-described shape in plan view.

Embodiment 1

<Method for Manufacturing Diffraction Grating>

A method for manufacturing a diffraction grating in Embodiment 1 will be described below with reference to FIG. 1. The method for manufacturing a diffraction grating in Embodiment 1 includes steps S11 to S18 shown in FIG. 1.

In step S11, a silicon diffraction grating 1 is prepared. The silicon diffraction grating 1 includes a wafer 1a made of, for example, silicon and having a front surface FS1 and a back surface BS1. The wafer 1a has, on the front surface FS1 thereof, a pattern 1b having a shape in which concave portions and convex portions are alternately arranged.

The pattern 1b is, for example, a resist pattern formed by a photolithography technique used in the field of manufacturing a semiconductor or a holographic exposure technique using interference of laser light. More specifically, the pattern 1b has a sinusoidal shape, a rectangular shape, a triangular shape, or a blazed shape. An area where the pattern 1b is formed (a marked line area) has a square planar shape, a rectangular planar shape, or a circular planar shape.

In steps S12 and S13, a metal film 3 is formed on the front surface FS1 of the wafer 1a, and a transfer area 3a to which the shape of the pattern 1b is transferred is formed on a part of a front surface FS2 of the metal film 3.

First, in step S12, a seed film 2 is deposited on the front surface FS1 of the wafer 1a having the pattern 1b by, for example, a sputtering method. The seed film 2 is made of a conductive material such as chromium, titanium, platinum, or gold. However, the material constituting the seed film 2 is not limited to the above-described material, and it is sufficient that the material has a function of carrying electrons from an electrode disposed on an end portion of the wafer 1a to a center of the wafer 1a without a voltage drop during electrolytic plating.

Next, in step S13, the metal film 3 is formed on the front surface FS1 of the wafer 1a (on the seed film 2) by, for example, a plating method so as to fill the concave portions of the pattern 1b and cover the convex portions of the pattern 1b. As the above-described plating method, an electrolytic plating method is suitable. The metal film 3 is made of a conductive material such as nickel or copper. However, the material constituting the metal film 3 is not limited to the above-described material, and any material may be used as long as electrolytic plating is possible and a film can be formed along the shape of the pattern 1b with high accuracy. In the following drawings, illustration of the seed film 2 is omitted.

In step S14, the metal film 3 is removed from the wafer 1a. The metal film 3 has the front surface FS2 and a back surface BS2. The transfer area 3a to which the shape of the pattern 1b is transferred is formed on a part of the front surface FS2. That is, the transfer area 3a has a shape in which concave portions and convex portions are alternately arranged, and has a sinusoidal shape, a rectangular shape, a triangular shape, or a blazed shape. The back surface BS2 is a flat surface.

In step S15, a bonding agent 4 is provided on the back surface BS2 of the metal film 3. The bonding agent 4 is applied to the back surface BS2 by, for example, a coating method, and is made of a material capable of bonding the metal film 3 and a glass substrate 5 to be described later without requiring a heat treatment. Since there is a large difference in linear expansion coefficient between the metal and the glass, the material constituting the bonding agent 4 is preferably a material that does not require a heat treatment.

In step S16, the metal film 3 is fixed by sandwiching an outer periphery of the metal film 3 between two restraint jigs 10 at a position not overlapping the transfer area 3a.

In step S17, the glass substrate 5 is bonded to the metal film 3 in a bonding jig 100 to be described later. The glass substrate 5 is provided on a front surface FS2 side of the metal film 3, and a glass substrate 6 is provided on a back surface BS2 side of the metal film 3. Thereafter, the glass substrate 5 is pressed toward the back surface BS2, and the metal film 3 is bonded to the glass substrate 5 via the bonding agent 4.

In step S18, the glass substrate 5 and the metal film 3 that are bonded to each other are taken out from the bonding jig 100. By such a manufacturing method, a diffraction grating (glass diffraction grating) 7 including the glass substrate 5, the bonding agent 4, and the metal film 3 is manufactured.

As described above, although the restraint jig 10 is used in step S16 and subsequent steps, the bonding jig 100 including the restraint jig 10 can be prepared in advance, and step S16 and subsequent steps are performed using the bonding jig 100. Hereinafter, each member of the bonding jig 100 and the method for manufacturing a diffraction grating in step S16 and subsequent steps will be described in detail with reference to FIGS. 2 to 11.

As shown in FIG. 9, the bonding jig 100 in Embodiment 1 includes two restraint jigs 10, a base plate 20, a lower fixing plate 30, an upper fixing plate 40, a load applying member 50, and a plurality of screws 60. Hereinafter, the structure will be described with reference to FIG. 2 to FIG. 7.

FIG. 2 and FIG. 3 show the restraint jig 10. The restraint jig 10 has a polygonal shape in plan view, and here, has a square shape. The restraint jig 10 is made of a material having high strength and high heat resistance, for example, stainless steel. The restraint jig 10 has an opening 13 in a central portion thereof, and has a plurality of holes 11 and a plurality of holes 12 around the opening 13. The holes 11 are provided for fixing to other members with screws 60, and the holes 12 are provided for aligning with guide pins 22 of the base plate 20.

The metal film 3 has a polygonal planar shape, here, has a square planar shape. The opening 13 has a polygonal planar shape corresponding to the planar shape of the metal film 3, here, has a square planar shape. A hole 14 integrated with the opening 13 is provided at each corner of the opening 13. In other words, the restraint jig 10 has a plurality of holes 14, and each of the plurality of holes 14 encloses each corner of the opening 13.

Step S16 described above is performed in a state where the metal film 3 around the transfer area 3a is sandwiched between two restraint jigs such that the transfer area 3a is located inside the opening 13 in plan view. At this time, each corner of the metal film 3 is located inside the hole 14 in plan view. In step S17, the metal film 3 is pressed against the glass substrate 5, and each corner of the metal film 3 is a portion where stress is easily concentrated. Therefore, unique stress is often generated at each corner. Here, by positioning each corner of the metal film 3 inside the hole 14, the concentration of stress at each corner can be alleviated, and a structure in which a load distribution on the metal film 3 is uniform can be implemented.

FIG. 4 shows the base plate 20. The base plate 20 has a planar shape similar to that of the restraint jig 10. A plurality of holes 21 and the guide pins 22 are provided in an outer peripheral portion of the base plate 20. The holes 21 are provided for fixing to other members with the screws 60, and the guide pins 22 are provided for aligning with other members.

FIG. 5 shows the lower fixing plate 30. The lower fixing plate 30 has a planar shape similar to that of the restraint jig 10. The lower fixing plate 30 has an opening 33 at a central portion thereof, and has a plurality of holes 31 and a plurality of holes 32 around the opening 33. The holes 31 are provided for fixing to other members with screws 60, and the holes 32 are provided for aligning with the guide pins 22 of the base plate 20.

The lower fixing plate 30 is a member for fixing a position of the glass substrate 6, and has the opening 33. The opening 33 and the glass substrate 6 each have a polygonal planar shape, here, have a square planar shape. Accordingly, the glass substrate 6 is fitted into the opening 33.

FIG. 6 shows the upper fixing plate 40. The upper fixing plate 40 has a planar shape similar to that of the restraint jig 10. The upper fixing plate 40 has an opening 43 at a central portion thereof, and has a plurality of holes 41 and a plurality of holes 42 around the opening 43. The holes 41 are provided for fixing to other members with the screws 60, and the holes 42 are provided for aligning with the guide pins 22 of the base plate 20.

The upper fixing plate 40 is a member for fixing a position of the glass substrate 5, and has the opening 43. The opening 43 and the glass substrate 5 each have a polygonal planar shape, here, have a square planar shape. Accordingly, the glass substrate 5 is fitted into the opening 43.

FIG. 7 shows the load applying member 50. The load applying member 50 is used when applying a load to the glass substrate 5. The load applying member 50 has a polygonal planar shape, here, has a square planar shape. The load applying member 50 is designed to be accommodated in the opening 43 of the upper fixing plate 40.

The base plate 20, the lower fixing plate 30, the upper fixing plate 40, and the load applying member 50 are made of a material having high strength and high heat resistance, for example, stainless steel.

FIG. 8 shows a process of installing the metal film 3 on the bonding jig 100, and FIG. 9 shows a state where the metal film 3 is installed on the bonding jig 100.

As shown in FIG. 8, the base plate 20, the lower fixing plate 30, the glass substrate 6, the metal film 3, and two restraint jigs 10 are prepared. First, the lower fixing plate 30 is provided on the base plate 20 while fitting the guide pins 22 of the base plate 20 into the holes 32. Next, the glass substrate 6 is provided inside the opening 33 of the lower fixing plate 30.

Next, the first restraint jig 10 is installed on the lower fixing plate 30 while fitting the holes 12 into the guide pins 22 of the base plate 20. Next, the metal film 3 is installed on the glass substrate 6, and the metal film 3 around the transfer area 3a is provided on the first restraint jig 10. The bonding agent 4 is provided on the back surface BS2 of the metal film 3. Next, the second restraint jig 10 is provided on the back surface BS2 of the metal film 3 around the transfer area 3a while fitting the guide pins 22 of the base plate 20 into the holes 12 of the upper fixing plate 40.

Next, as shown in FIG. 9, the upper fixing plate 40, the glass substrate 5, the load applying member 50, and the screws 60 are prepared. The upper fixing plate 40 is installed on the second restraint jig 10 while fitting the guide pins 22 of the base plate 20 into the holes 42. Next, the glass substrate 5 is installed inside the opening 43 of the upper fixing plate 40. Next, the load applying member 50 is installed on the glass substrate 5.

Thereafter, positions thereof are fixed by inserting the screws 60 into the holes 41 of the upper fixing plate 40, the holes 11 of the two restraint jigs 10, the holes 31 of the lower fixing plate 30, and the holes 21 of the base plate 20. Accordingly, the metal film 3 is fixed in a state where the metal film 3 around the transfer area 3a is sandwiched between the two restraint jigs.

Hereinafter, a state before and after a load is applied to the metal film 3 will be described with reference to FIGS. 10 and 11. FIG. 10 and FIG. 11 are cross-sectional views taken along a line A-A shown in FIG. 9.

By shifting a state of "before load application" shown in FIG. 10 to a state of "after load application" shown in FIG. 11, a step of bonding the back surface BS2 of the metal film 3 to the glass substrate 5 via the bonding agent 4 is performed. This step is performed in a vacuum atmosphere.

First, in FIG. 10, the metal film 3 is installed on the glass substrate 6 such that the front surface FS2 of the metal film 3 faces the glass substrate 6. The bonding agent 4 is provided on the back surface BS2 of the metal film 3. The glass substrate 5 is provided at a position physically separated from the back surface of the metal film 3. That is, a gap 70 is formed between the glass substrate 5 and the metal film 3 (the bonding agent 4). An installation surface of the glass substrate 6 on which the metal film 3 is installed and a bonding surface of the glass substrate 5 bonded to the metal film 3 via the bonding agent 4 are flat surfaces.

From such a state, by pressing the glass substrate 5 toward the back surface BS2 of the metal film 3 by the load applying member 50, a state as shown in FIG. 11 is obtained. The "after load application" corresponds to step S17 in FIG. 1. Thereafter, by dismantling the bonding jig 100, a diffraction grating 7 including the glass substrate 5 and the metal film 3 that are bonded via the bonding agent 4 can be obtained.

Main Effects of Embodiment 1

As described above, according to the method for manufacturing a diffraction grating in Embodiment 1, the shape of the pattern 1*b* provided on the wafer 1*a* is transferred to the metal film 3, and the metal film 3 is used for the diffraction grating 7. Accordingly, warpage of the silicon wafer, which is a problem in the related art, can be prevented from being transferred, and thus the diffraction grating 7 that has high surface precision and can be made large in area can be provided.

On the other hand, according to the study of the present inventors, when bonding the glass substrate 5 and the metal film 3 via the bonding agent 4, the bonding agent 4 contracts, the metal film 3 is drawn in, and wrinkles are generated. In a case where the bonding step is performed in the atmosphere, wrinkles are generated when air bubbles are mixed, making it difficult to achieve high surface precision.

In contrast, in Embodiment 1, the glass substrate 5 is pressed while the outer periphery of the metal film 3 is fixed by the restraint jigs 10. Accordingly, the generation of wrinkles due to the influence of the contraction of the bonding agent 4 can be prevented. Since the bonding agent 4 is made of a material that does not require a heat treatment, the influence of contraction of the bonding agent 4 can be prevented.

The back surface BS2 of the metal film 3 and the bonding surface of the glass substrate 5 that are bonded via the bonding agent 4 are flat surfaces. Here, when the glass substrate 5 is simply pressed against the back surface BS2 of the metal film 3, air bubbles are mixed and wrinkles are easily generated. Therefore, as shown in FIG. 10, the gap 70 is provided between the glass substrate 5 and the metal film 3 (the bonding agent 4). By pressing the glass substrate 5 against the back surface BS2 of the metal film 3 in a vacuum atmosphere, the back surface BS2 of the metal film 3 and the glass substrate 5 are bonded via the bonding agent 4. Accordingly, the generation of wrinkles due to air bubbles can be prevented, and the high surface precision can be implemented.

Application Example 1 of Diffraction Grating 7

The diffraction grating 7 manufactured in Embodiment 1 can be applied as an optical element used in a spectrometer or the like. For example, a step of forming a reflective film made of a material having a light reflectivity higher than that of the material constituting the metal film 3 on the front surface FS2 of the metal film 3 including the transfer area 3*a* is added between step S14 and step S15 in FIG. 1. Such a reflective film is, for example, an aluminum film, and can be formed by, for example, a vapor deposition method. Accordingly, the diffraction grating 7 can be used as a reflective optical element.

Application Example 2 of Diffraction Grating 7

FIG. 12 is another application example of the diffraction grating 7, and shows a method for manufacturing a replica grating performed by using the diffraction grating 7 as a mold. That is, FIG. 12 shows a method for manufacturing a plurality of replica gratings by using the diffraction grating 7 as a master diffraction grating.

First, in step S31, a resin film 91 having a front surface FS3 and a back surface BS3 and a glass substrate 92 bonded to the back surface BS3 of the resin film 91 are prepared. The resin film 91 is a thermosetting resin such as an epoxy resin.

In step S32, the diffraction grating 7 is prepared, and a peripheral portion of the metal film 3 is cut in accordance with a size of the glass substrate 5.

In step S33, the resin film 91 is pressed onto the front surface FS2 of the metal film 3 including the transfer area 3*a*. Accordingly, a transfer area 91*a* to which a shape of the transfer area 3*a* is transferred is formed on a part of the front surface FS3 of the resin film 91. That is, the transfer area 91*a* has a shape in which concave portions and convex portions are alternately arranged, and has a sinusoidal shape, a rectangular shape, a triangular shape, or a blazed shape. Next, the resin film 91 is cured in a state where the shape of the transfer area 91*a* is maintained by performing a heat treatment of, for example, 70° C. to 150° C. on the resin film 91.

In step S34, the resin film 91 and the glass substrate 92 are removed from the metal film 3. Accordingly, a replica grating 93 having the resin film 91 including the transfer area 91*a* and the glass substrate 92 is manufactured. By repeating such steps S31 to S33, a plurality of replica gratings 93 can be easily manufactured based on the diffraction grating 7.

As described above, in the diffraction grating 7 including the metal film 3, the warpage of the wafer 1*a* is prevented from being transferred, and high surface precision is implemented. Accordingly, even in the replica grating 93 including the glass substrate 92 and the resin film 91 including the transfer area 91*a* to which the shape of the transfer area 3*a* is transferred, the warpage of the wafer 1*a* is prevented from being transferred, and the high surface precision is implemented.

When the replica grating 93 is applied as a reflective optical element, a reflective film is formed on the front surface FS3 of the resin film 91 including the transfer area 91*a*. Such a reflective film is, for example, an aluminum film, and can be formed by, for example, a vapor deposition method.

Embodiment 2

A method for manufacturing a diffraction grating in Embodiment 2 will be described below with reference to FIG. 13. The method for manufacturing a diffraction grating in Embodiment 2 includes steps S21 to S28 shown in FIG. 13. In the following description, differences from Embodiment 1 will be mainly described, and overlapping points with Embodiment 1 will not be described.

Steps S21 to S25 are the same as steps S11 to S15 in Embodiment 1. In step S26, an outer periphery of the metal film 3 is fixed at a position not overlapping the transfer area 3*a* by using a restraint jig 80.

In step S27, the glass substrate 5 is bonded to the metal film 3 in a bonding jig 200 to be described later. The glass substrate 5 is provided on a front surface FS2 side of the metal film 3, and the glass substrate 6 is provided on a back surface BS2 side of the metal film 3. Thereafter, the glass substrate 5 is pressed toward the back surface BS2, and the metal film 3 is bonded to the glass substrate 5 via the bonding agent 4.

In step S28, the glass substrate 5 and the metal film 3 that are bonded to each other are taken out from the bonding jig 100. As described above, the diffraction grating 7 including the glass substrate 5, the bonding agent 4, and the metal film 3 is manufactured as the diffraction grating in Embodiment 1.

The glass substrate 5 and the glass substrate 6 in Embodiment 2 are different from those in Embodiment 1 in that planar shapes thereof are circular. By using the circular glass substrate 5 and glass substrate 6, generation of unique stress can be prevented when a load is applied. Accordingly, in Embodiment 2, a structure in which a load distribution on the metal film 3 is uniform can be implemented, and high surface precision can be implemented.

Hereinafter, each member of the bonding jig 200 and the method for manufacturing a diffraction grating in step S26 and subsequent steps will be described in detail with reference to FIG. 14 to FIG. 22.

As shown in FIG. 20, the bonding jig 200 in Embodiment 2 includes the restraint jig 80, the base plate 20, the lower fixing plate 30, the upper fixing plate 40, the load applying member 50, and a plurality of screws 60. Hereinafter, the structure will be described with reference to FIG. 14 to FIG. 20.

FIG. 14 shows the restraint jig 80. The restraint jig 80 has a circular shape in plan view. The restraint jig 80 is made of, for example, copper. The restraint jig 80 has an opening 83 at a central portion thereof. The opening 83 has a circular planar shape.

Step S26 described above is performed in a state where the restraint jig 80 is installed on the back surface BS2 of the metal film 3 around the transfer area 3*a* such that the transfer area 3*a* is located inside the opening 83 in plan view.

As shown in FIG. 15 to FIG. 18, the base plate 20, the lower fixing plate 30, the upper fixing plate 40, and the load applying member 50 have substantially the same structure as that of Embodiment 1 except that the planar shape thereof is mainly circular, and play the same role as that of Embodiment 1. In Embodiment 2, the base plate 20 is not provided with the guide pins 22, and the lower fixing plate 30 and the upper fixing plate 40 are not provided with the holes 32 and the holes 42, but these members may be provided.

As shown in FIG. 16, the opening 33 of the lower fixing plate 30 has a circular planar shape. Accordingly, the circular glass substrate 6 can be fitted into the opening 33. As shown in FIG. 17, the opening 43 of the upper fixing plate 40 has a circular planar shape. Accordingly, the circular glass substrate 5 can be fitted into the opening 43.

FIG. 19 shows a process of installing the metal film 3 on the bonding jig 200, and FIG. 20 shows a state where the metal film 3 is installed on the bonding jig 200.

As shown in FIG. 19, the base plate 20, the lower fixing plate 30, the glass substrate 6, the metal film 3, and the restraint jigs 80 are prepared. First, the lower fixing plate 30 is provided on the base plate 20. Next, the glass substrate 6 is provided inside the opening 33 of the lower fixing plate 30. Next, the metal film 3 is installed on the glass substrate 6, and the metal film 3 around the transfer area 3*a* is provided on the lower fixing plate 30. The bonding agent 4 is provided on the back surface BS2 of the metal film 3. Next, the restraint jig 80 is provided on the back surface BS2 of the metal film 3 around the transfer area 3*a*.

Next, as shown in FIG. 20, the upper fixing plate 40, the glass substrate 5, the load applying member 50, and the screws 60 are prepared. The upper fixing plate 40 is installed on the restraint jig 80. Next, the glass substrate 5 is installed inside the opening 43 of the upper fixing plate 40. Next, the load applying member 50 is installed on the glass substrate 5.

Thereafter, positions thereof are fixed by inserting the screws 60 into the holes 41 of the upper fixing plate 40, the holes 31 of the lower fixing plate 30, and the holes 21 of the base plate 20. Accordingly, the metal film 3 around the transfer area 3*a* can be fixed between the restraint jig 80 and the lower fixing plate 30. In Embodiment 2, when the upper fixing plate 40 is fixed with the screws 60, the restraint jig 80 may be compressed by the upper fixing plate 40. As long as the metal film 3 can be fixed, there is no particular problem even when the restraint jig 80 is compressed.

Hereinafter, states before and after a load is applied to the metal film 3 will be described with reference to FIG. 21 and FIG. 22. FIG. 21 and FIG. 22 are cross-sectional views taken along a line B-B shown in FIG. 20.

By shifting a state of "before load application" shown in FIG. 21 to a state of "after load application" shown in FIG. 22, a step of bonding the back surface BS2 of the metal film 3 to the glass substrate 5 via the bonding agent 4 is performed. This step is performed in a vacuum atmosphere as in Embodiment 1.

First, in FIG. 21, the metal film 3 is installed on the glass substrate 6 such that the front surface FS2 of the metal film 3 faces the glass substrate 6. The bonding agent 4 is provided on the back surface BS2 of the metal film 3. The glass substrate 5 is provided at a position physically separated from the back surface of the metal film 3. That is, the gap 70 is formed between the glass substrate 5 and the metal film 3 (the bonding agent 4). In Embodiment 2, an installation surface of the glass substrate 6 on which the metal film 3 is installed and a bonding surface of the glass substrate 5 bonded to the metal film 3 via the bonding agent 4 are flat surfaces.

From such a state, by pressing the glass substrate 5 toward the back surface BS2 of the metal film 3 by the load applying member 50, a state as shown in FIG. 22 is obtained. The "after load application" corresponds to step S27 in FIG. 13. Thereafter, by dismantling the bonding jig 200, the diffraction grating 7 including the glass substrate 5 and the metal film 3 that are bonded via the bonding agent 4 can be obtained.

In this way, according to Embodiment 2, substantially the same effect as that of Embodiment 1 can be obtained. The diffraction grating 7 manufactured in Embodiment 2 can also be applied as an optical element used in a spectrometer or the like as in Embodiment 1, and can be applied to manufacture of a plurality of replica gratings as a master diffraction grating as shown in FIG. 12.

Although the present invention has been specifically described based on the above-described embodiments, the present invention is not limited to the above-described embodiments, and various modifications can be made without departing from the gist of the present invention.

REFERENCE SIGNS LIST

1: silicon diffraction grating
1*a*: wafer

1b: pattern
2: seed film
3: metal film
3a: transfer area
4: bonding agent
5, 6: glass substrate
7: diffraction grating (glass diffraction grating)
10: restraint jig
11: hole for fixing
12: hole for aligning
13: opening
14: hole
20: base plate
21: hole for fixing
22: guide pin
30: lower fixing plate for glass substrate
31: hole for fixing
32: hole for aligning
33: opening
40: upper fixing plate for glass substrate
41: hole for fixing
42: hole for aligning
43: opening
50: load applying member
60: screw
70: gap
80: restraint jig
83: opening
91: resin film
91a: transfer area
92: glass substrate
93: replica grating
100, 200: bonding jig
FS1: front surface of wafer
FS2: front surface of metal film
FS3: front surface of resin film
BS1: back surface of wafer
BS2: back surface of metal film
BS3: back surface of resin film
The invention claimed is:

1. A method for manufacturing a diffraction grating, the method comprising:
   a step (a) of preparing a wafer having, on a front surface thereof, a pattern having a shape in which concave portions and convex portions are alternately arranged;
   a step (b) of, after the step (a), forming a metal film on the front surface of the wafer and forming, on a part of a front surface of the metal film, a first transfer area to which the shape of the pattern is transferred;
   a step (c) of, after the step (b), removing the metal film from the wafer;
   a step (d) of, after the step (c), bonding a back surface of the metal film to a first glass substrate via a bonding agent; and
   a step (e) of, before step (d) or any other preceding steps, preparing a first restraint jig having a first opening in a central portion thereof and a second restraint jig having a second opening in a central portion thereof, wherein
   the step (d) is performed in a vacuum atmosphere,
   the back surface of the metal film and a bonding surface of the first glass substrate that are bonded via the bonding agent are flat surfaces,
   the step (d) is performed in a state where the metal film around the first transfer area is sandwiched between the first restraint jig and the second restraint jig such that the first transfer area is located inside each of the first opening and the second opening in plan view, the first opening and the second opening each have a polygonal planar shape,
   each corner of the first opening and each corner of the second opening are provided with a hole integrated with the first opening and a hole integrated with the second opening, respectively
   the metal film has a polygonal planar shape, and
   in the step (d), each corner of the metal film is located inside the hole of each of the first opening and the second opening in plan view.

2. The method for manufacturing a diffraction grating according to claim 1, further comprising:
   a step (f) of preparing a load applying member for applying a load to the first glass substrate, wherein
   the step (d) is performed by pressing the first glass substrate toward the back surface of the metal film by the load applying member from a state where the bonding agent is provided on the back surface of the metal film and the first glass substrate is provided at a position physically separated from the back surface of the metal film.

3. A method for manufacturing a diffraction grating, the method comprising:
   a step (a) of preparing a wafer having, on a front surface thereof, a pattern having a shape in which concave portions and convex portions are alternately arranged;
   a step (b) of, after the step (a), forming a metal film on the front surface of the wafer and forming, on a part of a front surface of the metal film, a first transfer area to which the shape of the pattern is transferred;
   a step (c) of, after the step (b), removing the metal film from the wafer;
   a step (d) of, after the step (c), bonding a back surface of the metal film to a first glass substrate via a bonding agent;
   a step (e) of, before step (d) or any other preceding steps, preparing a third restraint jig having a circular shape in plan view and having a third opening that is circular in plan view in a central portion thereof; and
   a step (f) of preparing a first fixing plate having a fourth opening that is circular in plan view in a central portion thereof, a second glass substrate that is circular in plan view, and a load applying member for applying a load to the first glass substrate, wherein
   the step (d) is performed in a vacuum atmosphere,
   the back surface of the metal film and a bonding surface of the first glass substrate that are bonded via the bonding agent are flat surfaces,
   the step (d) is performed in a state where the third restraint jig is installed on the back surface of the metal film around the first transfer area such that the first transfer area is located inside the third opening in plan view,
   the second glass substrate is provided inside the fourth opening,
   the metal film around the first transfer area is fixed between the third restraint jig and the first fixing plate, and
   the step (d) is performed by pressing the first glass substrate toward the back surface of the metal film by the load applying member from a state where the metal film is installed on the second glass substrate such that the front surface of the metal film faces the second glass substrate, the bonding agent is provided on the back surface of the metal film, and the first glass substrate is provided at a position physically separated from the back surface of the metal film.

4. The method for manufacturing a diffraction grating according to claim 1, wherein in the step (b), the metal film is formed on the front surface of the wafer by a plating method so as to fill the concave portions of the pattern and cover the convex portions of the pattern.

5. The method for manufacturing a diffraction grating according to claim 1, wherein the bonding agent is made of a material capable of bonding the metal film and the first glass substrate without requiring a heat treatment.

6. The method for manufacturing a diffraction grating according to claim 1, wherein the pattern has a sinusoidal shape, a rectangular shape, a triangular shape, or a blazed shape.

7. The method for manufacturing a diffraction grating according to claim 1, further comprising:

a step (h) of forming a first reflective film on the front surface of the metal film including the first transfer area between the step (b) and the step (c), the first reflective film being made of a material having a light reflectivity higher than that of a material constituting the metal film.

8. A method for manufacturing a replica grating by using, as a mold, a diffraction grating manufactured by the method for manufacturing a diffraction grating according to claim 1 and including the first glass substrate and the metal film that are bonded via the bonding agent, the method comprising:

a step (i) of preparing a resin film and a third glass substrate bonded to a back surface of the resin film;

a step (j) of, after the step (i), pressing the resin film onto a front surface of the metal film including the first transfer area to form, on a part of the front surface of the resin film, a second transfer area to which a shape of the first transfer area is transferred; and a step (k) of removing the resin film and the third glass substrate from the metal film after the step (j).

9. The method for manufacturing a diffraction grating according to claim 3, wherein in the step (b), the metal film is formed on the front surface of the wafer by a plating method so as to fill the concave portions of the pattern and cover the convex portions of the pattern.

10. The method for manufacturing a diffraction grating according to claim 3, wherein the bonding agent is made of a material capable of bonding the metal film and the first glass substrate without requiring a heat treatment.

11. The method for manufacturing a diffraction grating according to claim 3, wherein the pattern has a sinusoidal shape, a rectangular shape, a triangular shape, or a blazed shape.

12. The method for manufacturing a diffraction grating according to claim 3, further comprising:

a step (h) of forming a first reflective film on the front surface of the metal film including the first transfer area between the step (b) and the step (c), the first reflective film being made of a material having a light reflectivity higher than that of a material constituting the metal film.

13. A method for manufacturing a replica grating by using, as a mold, a diffraction grating manufactured by the method for manufacturing a diffraction grating according to claim 3 and including the first glass substrate and the metal film that are bonded via the bonding agent, the method comprising:

a step (i) of preparing a resin film and a third glass substrate bonded to a back surface of the resin film;

a step (j) of, after the step (i), pressing the resin film onto a front surface of the metal film including the first transfer area to form, on a part of the front surface of the resin film, a second transfer area to which a shape of the first transfer area is transferred; and a step (k) of removing the resin film and the third glass substrate from the metal film after the step (j).

\* \* \* \* \*